(12) United States Patent
Kim

(10) Patent No.: US 7,671,927 B2
(45) Date of Patent: Mar. 2, 2010

(54) METHOD FOR REDUCING CHANNEL SWITCHING DELAY IN DIGITAL BROADCAST RECEIVER AND DIGITAL BROADCAST RECEIVER USING THE SAME

(75) Inventor: Chul-min Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 969 days.

(21) Appl. No.: 11/209,720

(22) Filed: Aug. 24, 2005

(65) Prior Publication Data

US 2006/0045189 A1 Mar. 2, 2006

(30) Foreign Application Priority Data

Aug. 27, 2004 (KR) ............... 10-2004-0067914

(51) Int. Cl.
*H04N 5/50* (2006.01)
*H04N 5/44* (2006.01)

(52) U.S. Cl. .................. 348/731; 348/725

(58) Field of Classification Search ............ 348/731, 348/726, 553, 725, 734; 725/38, 32
See application file for complete search history.

(56) References Cited

U.S. PATENT DOCUMENTS

| | | | | |
|---|---|---|---|---|
| 5,563,884 A | * | 10/1996 | Fimoff et al. | 370/391 |
| 5,570,136 A | | 10/1996 | Kim | |
| 5,845,083 A | * | 12/1998 | Hamadani et al. | 709/231 |
| 5,933,192 A | * | 8/1999 | Crosby et al. | 375/240.25 |
| 6,118,498 A | * | 9/2000 | Reitmeier | 348/725 |
| 6,473,137 B1 | | 10/2002 | Godwin et al. | |
| 6,490,001 B1 | | 12/2002 | Shintani et al. | |
| 6,674,802 B2 | * | 1/2004 | Knee et al. | 375/240.26 |
| 6,728,965 B1 | * | 4/2004 | Mao | 725/38 |
| 6,868,292 B2 | * | 3/2005 | Ficco et al. | 700/19 |

(Continued)

FOREIGN PATENT DOCUMENTS

JP 8-102894 4/1996

(Continued)

OTHER PUBLICATIONS

Search Report issued Apr. 23, 2008 in corresponding European Patent Application No. 05255191.8.

(Continued)

*Primary Examiner*—Victor Kostak
(74) *Attorney, Agent, or Firm*—Staas & Halsey LLP

(57) ABSTRACT

A method and an apparatus for reducing channel switching delay in a digital broadcast receiver are provided. The digital broadcast receiver includes a signal reception unit, which receives a broadcast signal and converts the received broadcast signal into an intermediate frequency (IF) signal, a digital demodulation unit, which retrieves a transport stream from the IF signal, a demultiplexing unit, which extracts a video signal from the transport stream by parsing the transport stream, a video decoder, which retrieves a video image from the video signal by decoding the video signal, and an output selection unit, which prevents a background image from being output and outputs the video image when sensing a first intra frame of the video signal input to the video decoder after the digital broadcast receiver is switched to a new channel.

20 Claims, 5 Drawing Sheets

U.S. PATENT DOCUMENTS

| | | | |
|---|---|---|---|
| 6,950,151 B1* | 9/2005 | Wrife | 348/731 |
| 6,985,188 B1* | 1/2006 | Hurst, Jr. | 348/553 |
| 7,280,739 B2* | 10/2007 | Yamauchi et al. | 386/68 |
| 7,523,482 B2* | 4/2009 | Barrett et al. | 725/120 |
| 2002/0075399 A1* | 6/2002 | Nemiroff et al. | 348/390.1 |
| 2003/0161395 A1* | 8/2003 | Byers | 375/240.01 |
| 2003/0227976 A1 | 12/2003 | Okada et al. | |
| 2003/0231863 A1* | 12/2003 | Eerenberg et al. | 386/68 |
| 2004/0003399 A1* | 1/2004 | Cooper | 725/38 |
| 2004/0034863 A1* | 2/2004 | Barrett et al. | 725/38 |
| 2004/0093618 A1* | 5/2004 | Baldwin et al. | 725/101 |
| 2004/0098741 A1 | 5/2004 | Hara | |
| 2004/0160974 A1* | 8/2004 | Read et al. | 370/431 |
| 2004/0181813 A1* | 9/2004 | Ota et al. | 725/131 |
| 2004/0189879 A1* | 9/2004 | Read | 348/731 |
| 2004/0194134 A1* | 9/2004 | Gunatilake et al. | 725/38 |
| 2005/0078757 A1* | 4/2005 | Nohrden | 375/240.28 |
| 2005/0081244 A1* | 4/2005 | Barrett et al. | 725/97 |
| 2005/0094733 A1* | 5/2005 | Daniell | 375/240.25 |
| 2005/0174352 A1* | 8/2005 | Gabrani et al. | 345/501 |
| 2005/0207449 A1* | 9/2005 | Zhang et al. | 370/486 |

FOREIGN PATENT DOCUMENTS

| | | |
|---|---|---|
| JP | 2002-51325 | 2/2002 |
| WO | 99/16247 | 4/1999 |

OTHER PUBLICATIONS

European Summons to Oral Proceedings for corresponding European Patent Application No. 05255191.8 dated Mar. 2, 2009 (7 pgs) (in English).

* cited by examiner

METHOD FOR REDUCING CHANNEL SWITCHING DELAY IN DIGITAL BROADCAST RECEIVER AND DIGITAL BROADCAST RECEIVER USING THE SAME

CROSS-REFERENCE TO RELATED APPLICATION

This application claims benefit from Korean Patent Application No. 10-2004-0067914 filed on Aug. 27, 2004 in the Korean Intellectual Property Office, the disclosure of which is incorporated herein by reference in its entirety.

BACKGROUND OF THE INVENTION

1. Field of the Invention

The present invention relates to a digital broadcast receiver and, more particularly, to a method and an apparatus for reducing channel switching delay in a digital broadcast receiver.

2. Description of the Related Art

A digital broadcast receiver is an apparatus that restores original digital data from a broadcast signal transmitted according to a digital transmission scheme. A digital broadcast transmitter, i.e., a broadcast station area (hereinafter, referred to as a head end) converts an analog signal into a digital signal comprised of 0 and 1 using digital technology, compresses the converted signal together with other information, and then transmits the compressed signal according to a digital transmission scheme. Then, the digital broadcast receiver receives and converts the transmitted signal into an original video and audio.

Compared to analog technology, digital technology is usually robust to noise, needs less transmission power, allows use of error correction, and has less degradation in transmission, copy, and accumulation. In addition, digital technology enables high band compression on a video/audio signal and facilitates search, processing, and editing of information. Digital broadcast using such digital technology is advantageous in that it is robust to noise and realizes efficient information transmission compared to conventional analog TV.

Due to recent developments in digital broadcast technology, photos and voice taken/recorded in a studio can be transmitted almost losslessly to a user's home together with a variety of additional information, which is not possible in analog broadcasting. Thus, a user can enjoy broadcast content of interest in various ways. For example, while watching a sports game on TV, a user can obtain information regarding the players in real time.

In digital broadcasting, a highly efficient data compression method, such as a Moving Picture Experts Group (MPEG) compression method, is used, and thus, unlike in analog broadcasting, it takes a considerable amount of time for a screen to become stable after switching broadcast channels. This channel switching delay is inconvenient to users.

That is, in analog broadcasting, a user can watch a broadcast program within about 0.2 seconds after switching channels. However, in digital broadcasting, it takes about ten times more time than in analog broadcasting to normally provide a broadcast program to a user after switching channels, which the user may perceive to be very inconvenient.

In the case of switching channels in a conventional digital broadcast receiver, a tuner waits for a predetermined amount of time after a phase locked loop (PLL) circuit is stabilized and then performs a forward error correction (FEC) operation on a digital signal to correct an error that may occur when a demodulation unit demodulates the digital signal. The forward-error-corrected digital signal is input to an MPEG decoder and then decompressed, thereby retrieving an analog image signal. Even after the forward-error-corrected digital signal is decompressed, the tuner also waits until the analog image signal becomes stabilized and then outputs the stabilized analog image signal.

In general, no specific detection methods are used to detect the amount of time required to stabilize a signal obtained as a result of performing the above operations in the conventional digital broadcast receiver. In the receiver, it usually takes 2-3 seconds for the signal to become stable enough to provide a broadcast program after switching channels. In particular, an MPEG encoder compresses video and audio signals as a combination of intra coded frames (I frames), bidirectionally predictive coded frames (B frames), and predictive coded frames (P frames). The numbers of B frames and P frames inserted between a pair of adjacent I frames vary according to a compression rate. The higher the compression rate, the greater the numbers of B frames and P frames inserted between a pair of adjacent I frames. For example, 'IBBBPBBBP . . .' corresponds to a higher compression rate than 'IBBPBBP . . .'

Here, an I frame is coded data that is decoded independently of other frames, a P frame is coded data that is decoded With reference to an I frame or P frame temporally previous thereto, and a B frame is coded data that is decoded with reference to an I frame or P frame temporally previous thereto or subsequent thereto.

An I frame is used as a reference frame when retrieving an image signal and is generated at intervals of about 0.5-1.5 sec. Conventionally, an MPEG decoder is generally set to have a delay time of more than 1.5 sec to wait for an I frame, which results in an increased amount of time required to switch channels. In order to reduce such channel switching delay, the MPEG decoder may be set to have a delay time of, for example, 0.5 sec. In this case, however, an abnormal screen may be temporarily provided to a user after switching channels, which is highly inconvenient and undesirable.

SUMMARY OF THE INVENTION

Additional aspects and/or advantages of the invention will be set forth in part in the description which follows and, in part, will be apparent from the description, or may be learned by practice of the invention.

The present invention provides a method and an apparatus for quickly switching channels in a digital broadcast receiver.

The present invention also provides a method and an apparatus for starting a demodulation without delay after stabilizing a phase locked loop (PLL) circuit in a tuner.

The present invention also provides a method and an apparatus for displaying a broadcast screen to a user after switching a digital broadcast receiver to a new channel, if a broadcast signal is normally output from a decoder of the digital broadcast receiver.

According to an aspect of the present invention, there is provided a digital broadcast receiver including a signal reception unit, which receives a broadcast signal and converts the received broadcast signal into an intermediate frequency (IF) signal, a digital demodulation unit, which retrieves a transport stream from the IF signal, a demultiplexing unit, which extracts a video signal from the transport stream by parsing the transport stream, a video decoder, which retrieves a video image from the video signal by decoding the video signal, and an output selection unit, which prevents a background image from being output and outputs the video image when sensing a first intra frame of the video signal input to the video decoder after the digital broadcast receiver is switched to a new channel.

The digital broadcast receiver may further include a display control unit, which processes the video image output by the output selection unit to convert it to a format compatible with an external video output device.

The video decoder may use an MPEG video codec.

The signal reception unit may include a tuner, which converts the received broadcast signal into an IF signal, a surface acoustic wave (SAW) filter, which removes signals of channels adjacent to the channel of the IF signal and noise signals, a phase locked loop (PLL) circuit, which controls a signal output from the SAW filter to enter a locked state and transmits a locked state notification signal to a first switch controller when the output signal of the SAW filter enters the locked state, the first switch controller, which controls a first output switch so that an output signal of the signal reception unit is prevented from being input to the digital demodulation unit when the digital broadcast receiver is switched to the new channel, and controls the first output switch so that the output signal of the signal reception unit is input to the digital demodulation unit when the locked state notification signal is received from the PLL circuit, and the first output switch, which is turned on and off by the first switch controller.

The video decoder may retrieve a video image from the video signal and transmits an intra frame notification signal to the output selection unit if the video image is a first intra frame retrieved after the digital broadcast receiver is switched to the new channel.

The output selection unit may include a second switch controller, which controls a second output switch so that the background image is output when the digital broadcast receiver is switched to the new channel and controls the second output switch so that the video image is output when the intra frame notification signal is received, and the second output switch, which is turned on and off by the second switch controller.

According to another aspect of the present invention, there is provided a method of reducing channel switching delay in a digital broadcast receiver including receiving a channel switch command, receiving a broadcast signal of a channel to which the digital broadcast receiver is switched in response to the channel switch command and retrieving a transport stream, retrieving a video image from a video signal of the transport stream, and sensing a first intra frame of the video signal input to the digital broadcast receiver after the digital broadcast receiver is switched to the new channel and controlling the video image to be output.

The method of reducing channel switching delay may further include controlling a background image stored in a memory to be output until sensing the first intra frame of the video signal input to the digital broadcast receiver after the digital broadcast receiver is switched to the new channel.

The retrieving of the video image may be carried out using an MPEG video codec.

The receiving of the broadcast signal and the retrieving of the transport stream may include converting the received broadcast signal into an IF signal, controlling the IF signal to enter a locked state, and determining whether the IF signal is in the locked state and retrieving a transport stream from the IF signal if the IF signal is determined to be in the locked state.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
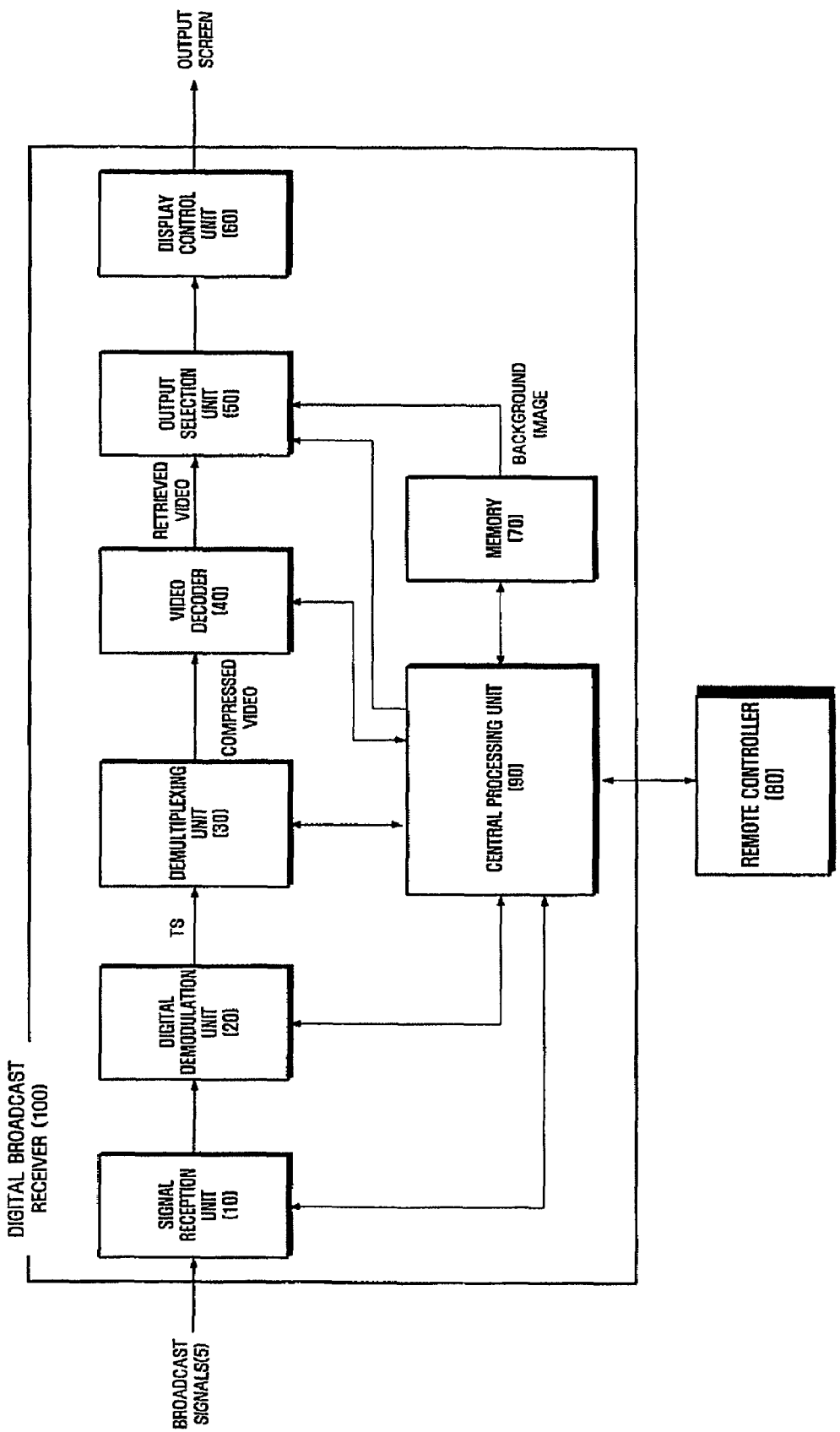
FIG. 1 is a block diagram of a digital broadcast receiver according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which preferred embodiments of this invention are shown. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

FIG. 1 is a block diagram of a digital broadcast receiver 100 according to an exemplary embodiment of the present invention. Referring to FIG. 1, the digital broadcast receiver 100 includes a signal reception unit 10, a digital demodulation unit 20, a demultiplexing unit 30, a video decoder 40, an output selection unit 50, a display control unit 60, a memory 70, and a central processing unit 90.

Figure 2:
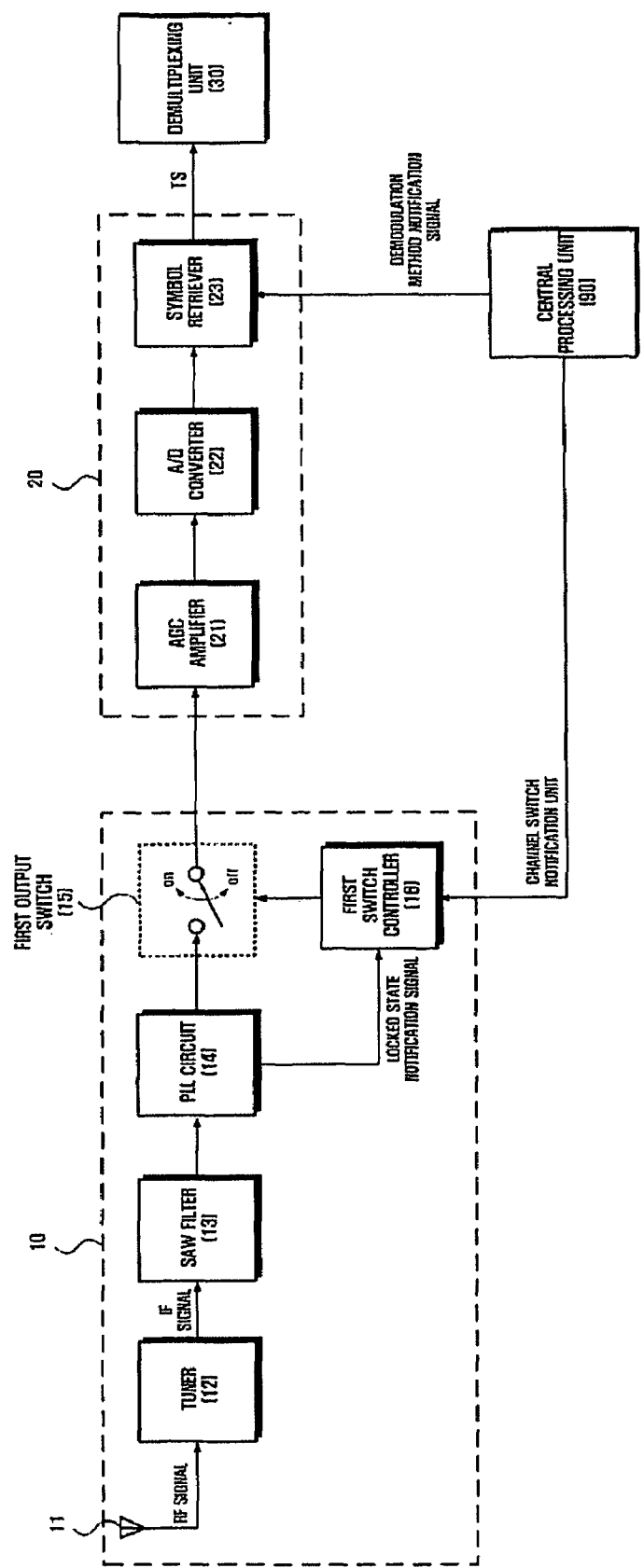
FIG. 2 is a detailed block diagram of a signal reception unit and a digital demodulation unit of FIG. 1.

The signal reception unit 10 receives one of a plurality of broadcast signals 5 transmitted via a wired/wireless medium. The broadcast signals 5 may be terrestrial broadcast signals, satellite broadcast signals, or cable broadcast signals. Referring to FIG. 2, the signal reception unit 10 may include a radio frequency (RF) antenna 11, which detects the broadcast signals 5 from the air and a tuner 12, which selects a broadcast signal of a channel from the broadcast signals 5 and converts the broadcast signal of the channel into an intermediate frequency (IF) signal. If the digital broadcast receiver 100 receives a cable broadcast program, the RF antenna 11 may be replaced by a signal input terminal of a cable modem. In the present embodiment, signals may be input via the RF antenna 11.

The tuner 12 provides the IF signal into which the broadcast signal of the channel of interest has been converted to the digital demodulation unit 20. Then, the digital demodulation unit 20 retrieves a transport stream from the IF signal provided by the tuner 12 and provides the retrieved transport stream to the demultiplexing unit 30.

The operations of the signal reception unit 10 and the digital demodulation unit 20 will now be described in further detail with reference to FIG. 2.

Referring to FIG. 2, the signal reception unit 10 includes the RF antenna 11, the tuner 12, a surface acoustic wave (SAW) filter 13, a phase locked loop (PLL) circuit 14, a first output switch 15, and a first switch controller 16. A variety of commands issued by a user may be input to the central processing unit 90 via a remote controller 80.

The tuner 12 converts an RF signal (e.g., a signal having a frequency of 50-860 MHz) into an IF signal and provides the IF signal to the SAW filter 13.

The SAW filter 13 removes signals of channels adjacent to the channel of the IF signal provided by the tuner 12 and noise signals and then outputs the IF signal to the PLL circuit 14.

The PLL circuit 14 calculates a difference between the phase of the IF signal output from the SAW filter 13 and the phase of a signal output from a first voltage controlled oscillator (VCO) and adjusts the voltage of the first VCO so that the calculated difference gradually diminishes. By repeating this type of loop, the phase of the output signal of the first VCO can be equalized to the phase of the IF signal output from the SAW filter 13, and this equalized state of the PLL circuit 14 is called a locked state.

The first output switch 15 is turned on or off under the control of the first switch controller 16. The first output switch 15 transmits a signal output from the PLL circuit 14 to the digital demodulation unit 20 when turned on and cuts off the transmission of the output signal of the PLL circuit 14 to the digital demodulation unit 20 when turned off.

Figure 4:
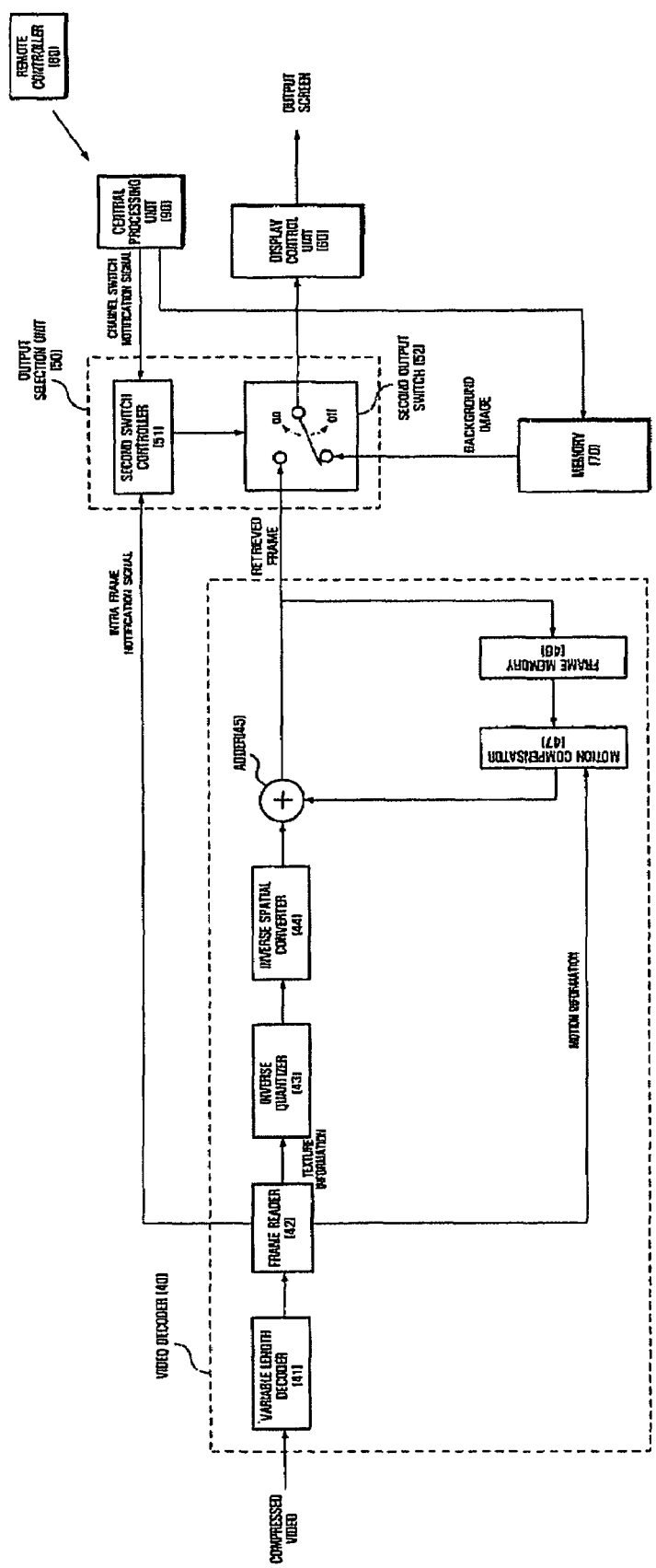
FIG. 4 is a detailed block diagram of a video decoder and an output selection unit of FIG. 1.

When a user inputs a channel switch command to the central processing unit 90 by pushing a predetermined button on the remote controller 80, in response to the channel switch command, the central processing unit 90 controls the digital demodulation unit 20 to perform modulation of the channel to be switched and transmits a channel switch notification signal to the first switch controller 16 and a second switch controller 51 (of FIG. 4).

The first switch controller 16 controls the operation of the first output switch 15. In detail, in the case of switching channels, the first switch controller 16 receives the channel switch notification signal from the central processing unit 90 and controls the first output switch 15 to be turned off so that the output signal of the signal reception unit 10 is prevented from being input to the digital demodulation unit 20. Thereafter, when the PLL circuit 14 enters a locked state as a result of its operation, the first switch controller 16 receives a locked state notification signal from the PLL circuit 14 and thus controls the first output switch 15 to be turned on so that the output signal of the signal reception unit 10 can be input to the digital demodulation unit 20. Therefore, when the PLL circuit 14 enters the locked state after the digital broadcast receiver 100 is switched to a new channel, the output signal of the signal reception unit 10 is immediately input to the digital demodulation unit 20 and then demodulated by the digital demodulation unit 20. Conventionally, in addition to the amount of time taken by the PLL circuit 14 to enter the locked state, a predetermined amount of time, for example, more than 100 milliseconds, is required to stabilize the PLL circuit 14 of the signal reception unit 10. Thus, the digital broadcast receiver 100 can display a new channel this much quicker.

The digital demodulation unit 20 includes an automatic gain control (AGC) amplifier 21, an analog-to-digital (A/D) converter 22, and a symbol retriever 23.

The AGC amplifier 21 compensates for the gain of the output signal of the signal reception unit 10 and outputs an analog signal that is convertible to a digital signal as the compensation result. In other words, even though the output signal of the signal reception unit 10 has been processed by the SAW filter 13, it is weak. Thus, the AGC amplifier 21 amplifies the output signal of the signal reception unit 10 to the extent that the amplified signal can be normally converted into a digital signal by the A/D converter 22.

The A/D converter 22 converts the amplified signal provided by the AGC amplifier 21 into a digital signal in accordance with a sampling frequency obtained by a second VCO (not shown) and outputs the digital signal to the symbol retriever 23.

Figure 3:
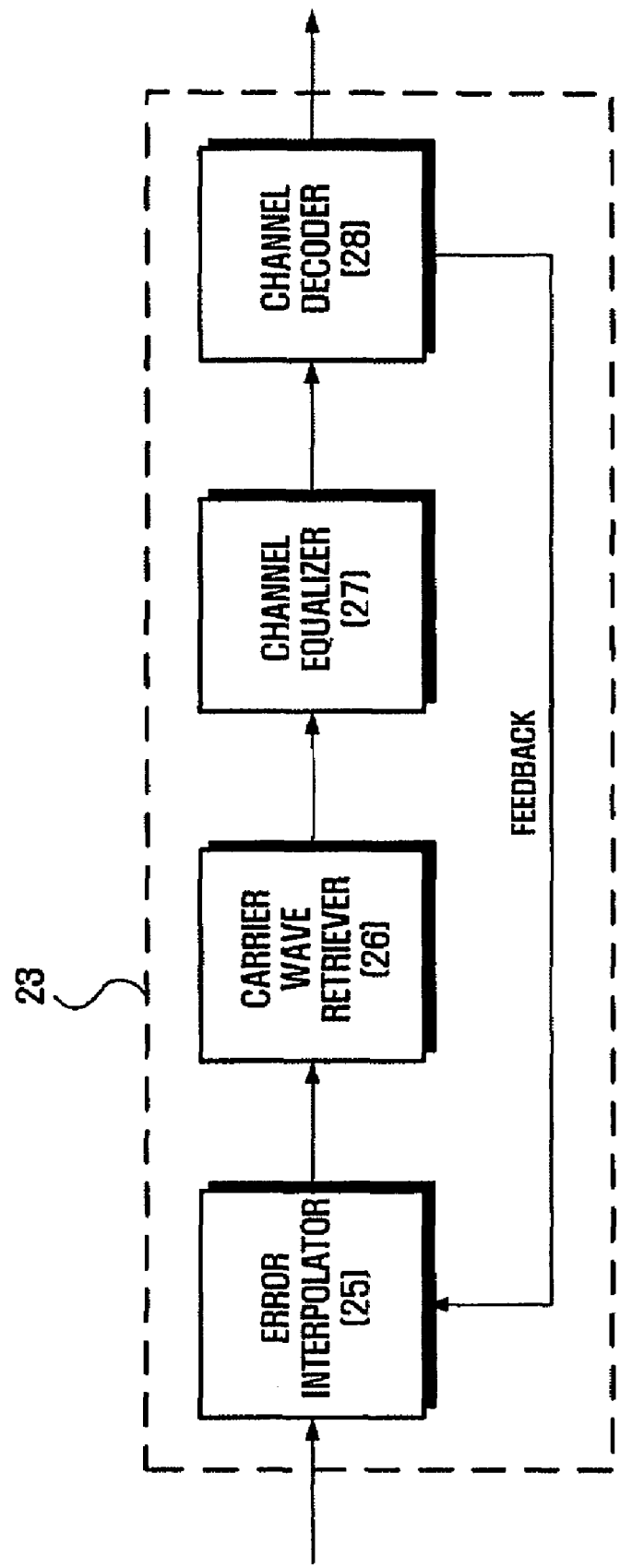
FIG. 3 is a detailed block diagram of a symbol retriever of FIG. 2.

The symbol retriever 23 retrieves transmission symbols from the digital signal using a demodulation method selected by the central processing unit 90, such as VSB-8, VSB-16, QAM64, QAM256, QAM1024, DPSK, or QPSK. The symbol retriever 23 outputs the retrieved transmission symbols to the outside of the digital demodulation unit 20. The symbol retriever 23 may include an error interpolator 25; a carrier wave retriever 26, a channel equalizer 27, and a channel decoder 28; as shown in FIG. 3.

A symbol timing error obtained as a result of processing a baseband digital signal, i.e., a timing error of transmission symbols obtained by the channel decoder 28, is fed back to the error interpolator 25. The error interpolator 25 performs an interpolation operation so that an error between the digital signal output from the A/D converter 22 and a signal fed back thereto from the channel decoder 28 can be reduced and outputs the interpolation result to the carrier wave retriever 26.

The carrier wave retriever 26 removes carrier wave frequency offsets and phase jitters from a band pass digital signal, digitally demodulates the resulting band pass digital signal into a baseband digital signal, and outputs the baseband digital signal to the channel equalizer 27.

The channel equalizer 27 removes inter-symbol interference caused by multiple paths from the baseband digital signal provided by the carrier wave retriever 26 and outputs the resulting baseband digital signal to the channel decoder 28. In other words, in a digital transmission system such as a high-definition TV (HDTV), a signal may be distorted in the process of being transmitted via multi-path channels, may be interfered with by NTSC signals, or may be distorted by a transmission/reception system, and thus, a bit detection error is highly likely to occur at a receiving party that receives the signal. In particular, the transmission of a signal via multiple paths is one of the main causes of such bit detection errors. Therefore, the channel equalizer 27 removes the inter-symbol interference caused by multiple paths from the baseband digital signal provided by the carrier wave retriever 26.

The channel decoder 28 removes burst noise and scattered noise from the baseband digital signal from which the inter-symbol interference has been removed by the channel equalizer 27, using a Reed-Solomon coding method and a grid modulation coding method. Thereafter, the channel decoder 28 retrieves synchronization signals that have been inserted into the baseband digital signal in the transmitter, from the baseband digital signal and retrieves received data, i.e., transmission symbols, using the synchronization signals.

Referring to FIG. 1, data output from the digital demodulation unit 20, i.e., a transport stream, is input to the demultiplexing unit 30. The demultiplexing unit 30 extracts a video signal from the transport stream by parsing the transport stream under the control of the central processing unit 90 and then provides the video signal to the video decoder 40.

The video decoder 40 retrieves a video image from the video signal provided by the demultiplexing unit 30 by decoding the corresponding video signal and then provides the video image to the output selection unit 50. The video decoder 40 may be realized based on various MPEG-based video compression methods, for example, MPEG-1, MPEG-2, and MPEG-4.

When the output selection unit 50 receives the channel switch notification signal from the central processing unit 90, it prevents the output of the video decoder 40 from being transmitted to the display control unit 60 and controls a background image stored in the memory 70 to be transmitted to the display control unit 60.

Thereafter, when a first intra frame is received, the output selection unit 50 prevents the background image stored in the memory 70 from being output to the display control unit 60 and controls the output of the video decoder 40 to be transmitted to the display control unit 60.

The structures and operations of the video decoder 40 and the output selection unit 50 will be described in further detail later with reference to FIG. 4.

The memory 70 provides the (background) image, a still picture, moving picture or informative information stored therein to the output selection unit 50 in response to a control command issued by the central processing unit 90. The memory 70 may be a non-volatile memory (e.g., a read-only memory (ROM), a flash memory, or a non-volatile random access memory (NVRAM)), a volatile memory (e.g., a synchronous dynamic random access memory (SDRAM)), or a disc storage medium (e.g., a hard disc or an optical disc). The background image may be an image containing a message such as "please, wait!" The background image may be realized in various image formats. In particular, the background image may be stored in the memory 70 in a non-compressed format, such as a bitmap format.

The display control unit 60 converts the format of a video signal input thereto to be compatible with an external video output device (not shown). For example, the display control unit 60 may convert a signal provided by the output selection unit 50 into standard definition (SD)-level video data (S-Video) using a buffer filter or may convert the signal into digital video interface (DVI) video data using a DVI.

The central processing unit 90 controls the general operation of the digital broadcast receiver 100 and may be embodied as a central processing unit (CPU) or a micro-computer. Even though the central processing unit 90 is illustrated in FIG. 1 as an independent element of the digital broadcast receiver 100, it may be embedded in each of the modules of the digital broadcast receiver 100 as a processor for enhancing the operating speed of a corresponding module or enabling the corresponding module to operate at full capacity.

FIG. 4 is a detailed block diagram of the video decoder 40 and the output selection unit 50. Referring to FIG. 4, the video decoder 40 includes a variable length decoder 41, a frame reader 42, an inverse quantizer 43, an inverse spatial converter 44, an adder 45, a frame memory 48, and a motion compensator 47.

The variable length decoder 41 receives a compressed video signal output from the demultiplexing unit 30 and performs a variable length decoding operation on the received compressed video signal. The variable length decoding operation performed by the variable length decoder 41 is a decoding operation corresponding to a lossless encoding operation.

The frame reader 42 reads texture information and motion information of a video frame from a bitstream losslessly retrieved through the variable length decoding operation, provides the texture information to the inverse quantizer 43 and provides the motion information to the motion compensator 47. The motion information may include motion vectors of a plurality of blocks constituting a current frame with respect to a reference frame, and a serial number of the reference frame.

Video frames are classified into intra frames that can be decoded without the need to refer to another frame, i.e., the reference frame, and inter frames that must be decoded with reference to the reference frame. In an MPEG codec, I frames are intra frames, and P and B frames are inter frames.

When a first intra frame is input to the frame reader 42 after the digital broadcast receiver 100 is switched to a new channel, the frame reader 42 transmits an intra frame notification signal to the output selection unit 50. The intra frame notification signal may be represented by 1 bit. For example; if a signal transmitted by the frame reader 42 is set to a value of 1, it is determined to be the intra frame notification signal. However, if the signal transmitted by the frame reader 42 is set to a value of 0, it is determined not to be the intra frame notification signal.

The inverse quantizer 43 performs an inverse quantization operation on the texture information provided by the variable length decoder 41, thereby obtaining a transformation coefficient. Inverse quantization is a process of obtaining a quantization coefficient from a predetermined value indexed and then transmitted by a video encoder (not shown). A table indicating the relationship between the quantization coefficient and the index of the predetermined value may be transmitted by the video encoder or may be agreed upon in advance by the video encoder and a video decoder.

The inverse spatial converter 44 inversely converts the transformation coefficient obtained by the inverse quantizer 43, into a transformation coefficient in a spatial area by performing an inverse spatial conversion operation, which is the opposite of a spatial conversion operation performed by the video encoder. The spatial conversion operation may be a discrete cosine transform (DCT) conversion operation or a wavelet conversion operation.

If the current frame is an intra frame, an original video image is immediately retrieved from the current frame by simply passing the current frame through the inverse spatial converter 44 and then is output to the output selection unit 50. However, if the current frame is an inter frame, the original video image is retrieved from the current frame by adding a motion-compensated frame to the current frame with the aid of the motion compensator 47 and then is output to the output selection unit 50.

The motion compensator 47 reconstructs a reference frame stored in the frame memory 48 with reference to the motion information provided by the frame reader 42, thereby generating the motion-compensated frame.

The output selection unit 50 may include the second switch controller 51 and a second output switch 52. When the channel switch notification signal is received from the central processing unit 90; the second switch controller 51 controls the second output switch 52 to be turned off. On the other hand, when the intra frame notification signal is received from the frame reader 42, the second switch controller 51 controls the second switch 52 to be turned on.

The second output switch 52 outputs different signals depending on whether it is turned on or off. In detail, the second output switch 52 provides the image retrieved by the video decoder 40 to the display control unit 60 when turned on and provides the background image stored in the memory 70 to the display control unit 60 in response to a command issued by the central processing unit 90 when turned off.

When the user issues the channel switch command to the central processing unit 90 using the remote controller 80, the central processing unit 90 transmits the channel switch notification signal to the second switch controller 51. Then, the second switch controller 51 controls the second outputs switch 52 to be turned off so that the background image stored in the memory 70 is displayed to the user. Thereafter, if the second switch controller 51 receives the intra frame notification signal from the frame reader 42, it controls the second output switch 52 to be turned on so that a retrieved digital broadcast image is displayed to the user. In short, in a case where the digital broadcast receiver 100 is switched to a new channel, it displays a background image to the user until receiving a first intra frame and then displays a broadcast image to the user immediately after receiving the first intra frame, and particularly, after the first intra frame is received by the video decoder 40. Thus, the digital broadcast receiver 100 can reduce temporary channel switching delay.

In the description of FIGS. 1 through 4, each component, as used herein, means, but is not limited to, a software or hardware component, such as a Field Programmable Gate Array (FPGA) or Application Specific Integrated Circuit (ASIC), which performs certain tasks. The functionality provided for in the component may be combined into fewer components or further separated into additional components.

Figure 5:
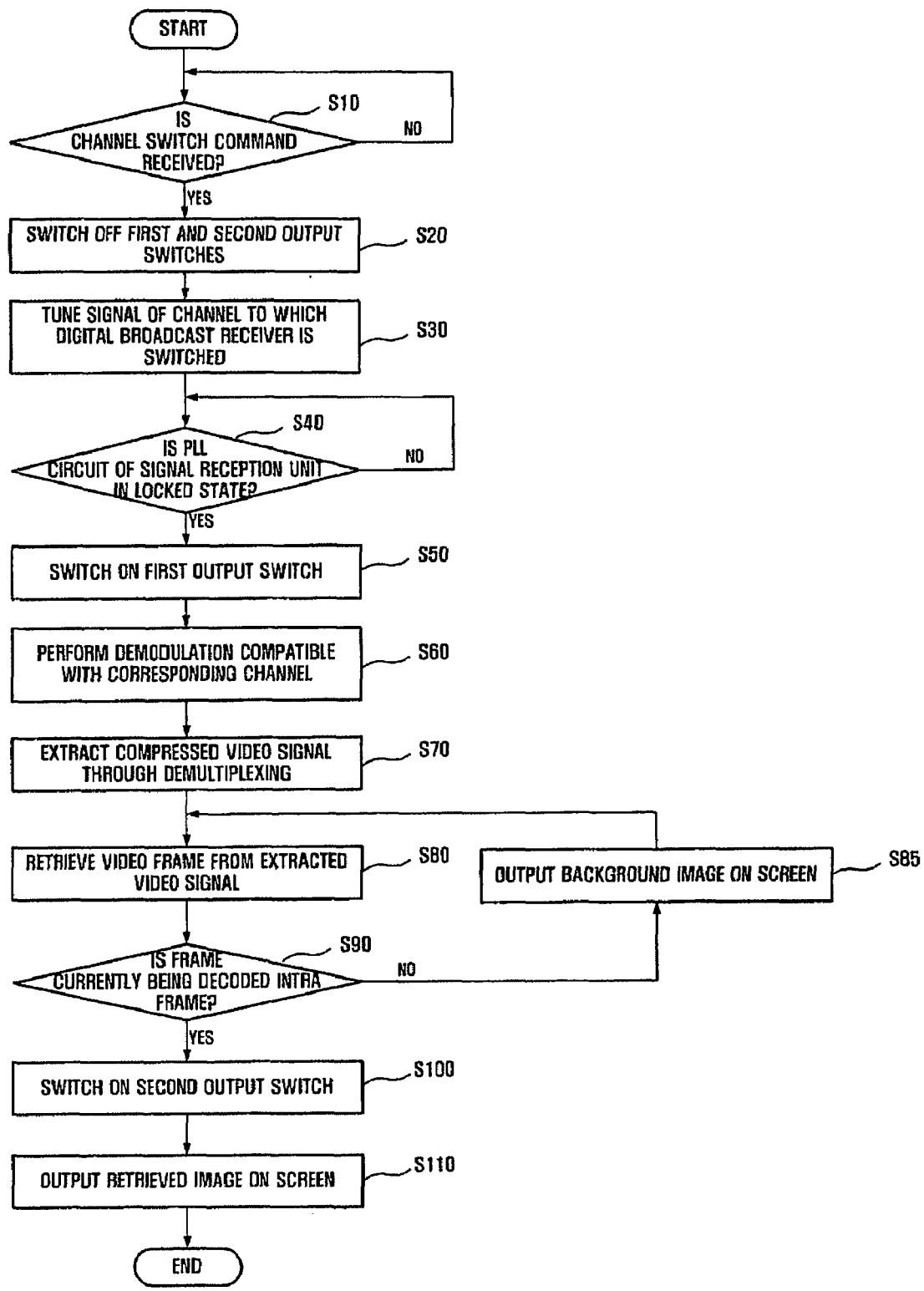
FIG. 5 is a flowchart illustrating a method of reducing channel switching delay in a digital broadcast receiver according to an exemplary embodiment of the present invention.

FIG. 5 is a flowchart illustrating a method of reducing channel switching delay in a digital broadcast receiver according to an exemplary embodiment of the present invention, i.e., the general operation of the digital broadcast receiver 100 of FIG. 1. Referring to FIGS. 1 and 5, in operation S10, the central processing unit 50 receives a channel switch command issued by a user using the remote controller 80 and transmits a channel switch notification signal to the first switch controller 16 and the second switch controller 51. In operation S20, the first switch controller 16 controls the first output switch 15 to be turned off so that a signal output from the signal reception unit 10 is prevented from being transmitted to the digital demodulation unit 20, and the second switch controller 51 controls the second output switch 52 to be turned off so that a background image stored in the memory 70, instead of a video signal output from the video decoder 40, is transmitted to the display control unit 60.

In operation S30, the signal reception unit 10 tunes a signal of a channel to which the digital broadcast receiver 100 is switched, and the PLL circuit 14 repeatedly reduces a difference between the phase of the tuned signal and the phase of a signal output from the first VCO. In operation S40, it is determined whether the PLL circuit 14 is in a locked state. If the PLL circuit 14 is in the locked state, it transmits a locked state notification signal to the first switch controller 16.

In operation S50, the first switch controller 15 controls the first output switch 15 to be turned on so that the output signal of the signal reception unit 10 is input to the digital demodulation unit 20.

In operation S60, the digital demodulation unit 20 demodulates the output signal of the signal reception unit 10 using a demodulation method compatible with the channel to which the digital broadcast receiver 100 is switched, thereby retrieving a transport stream.

In operation S70, the demultiplexing unit 30 demultiplexes the transport stream, thereby extracting a compressed video signal.

In operation S80, the video decoder 40 decodes the compressed video signal on a frame-by-frame basis, thereby retrieving a video image. In operation S90, it is determined whether a frame currently being decoded by the video decoder 40 is an intra frame. If the current frame is determined not to be an intra frame in operation S90, the background image stored in the memory 70 is displayed on a screen in operation S85 because the second output switch 52 is currently turned off. Thereafter, the method returns to operation S80.

However, if the current frame is determined to be an intra frame in operation S90, the video decoder 40 transmits an intra frame notification signal to the second switch controller 51 in operation S100, and then, the second switch controller 51 controls the second output switch 52 to be turned on. In operation S110, the video image retrieved by the video decoder 40 is displayed on the screen.

In the present embodiment, the digital broadcast receiver 100 can save as much as about 0.1 sec in the signal reception unit 10. When receiving image data compressed at high rates, a video decoder of a conventional digital broadcast receiver is invariably delayed by about 1.5 sec when intra frames are input thereto at intervals of up to about 1.5 sec. In reality, an intra frame of a broadcast signal is generated at intervals of about 0.5 sec, and an average amount of time taken to generate an intra frame after the digital demodulation unit 20 outputs a transport stream is half of the interval between intra frames, i.e., 0.25 sec. Thus, the digital broadcast receiver 100 can save as much as about 1.25 sec in the digital demodulation unit 20.

In short, the digital broadcast receiver 100 can save as much as about 0.1 sec in the signal reception unit 10 and as much as about 1.25 sec in the digital demodulation unit 20. Thus, the digital broadcast receiver 100 can reduce channel switching delay by a total of about 1.35 sec.

As described above, the method and the apparatus according to the present invention can reduce delay time caused when the digital broadcast receiver is switched to a new channel.

Accordingly, it is possible to minimize a user's inconvenience and enhance the user's preference for a digital broadcast receiver by immediately outputting a broadcast program after the digital broadcast receiver is switched to a new channel.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A digital broadcast receiver, comprising:
    a signal reception unit, which receives a broadcast signal and converts the received broadcast signal into an intermediate frequency (IF) signal;
    a digital demodulation unit, which retrieves a transport stream from the IF signal;
    a demultiplexing unit, which extracts a video signal from the transport stream by parsing the transport stream;
    a video decoder, which retrieves a video image from the video signal by decoding the video signal; and
    an output selection unit, which prevents a background image from being output and outputs the video image directly to a display control unit for display upon sensing reception of a first intra frame of the video signal input to the video decoder after the digital broadcast receiver is switched to a new channel.

2. The digital broadcast receiver of claim 1, wherein the display control unit processes the video image output by the output selection unit to convert it to a format compatible with an external video output device.

3. The digital broadcast receiver of claim 1, wherein the video decoder uses an MPEG video codec.

4. The digital broadcast receiver of claim 1, wherein the signal reception unit comprises:
   a tuner, which converts the received broadcast signal into an IF signal;
   a surface acoustic wave (SAW) filter, which removes signals of channels adjacent to the channel of the IF signal and noise signals;
   a phase locked loop (PLL) circuit, which controls a signal output from the SAW filter to enter a locked state and transmits a locked state notification signal to a first switch controller when the output signal of the SAW filter enters the locked state;
   the first switch controller, which controls a first output switch so that an output signal of the signal reception unit is prevented from being input to the digital demodulation unit when the digital broadcast receiver is switched to the new channel, and controls the first output switch so that the output signal of the signal reception unit is input to the digital demodulation unit when the locked state notification signal is received from the PLL circuit; and
   the first output switch, which is turned on and off by the first switch controller.

5. The digital broadcast receiver of claim 1, wherein the video decoder retrieves a video image from the video signal and transmits an intra frame notification signal to the output selection unit if the video image is a first intra frame retrieved after the digital broadcast receiver is switched to the new channel.

6. The digital broadcast receiver of claim 5, wherein the output selection unit comprises:
   a second switch controller, which controls a second output switch so that the background image is output when the digital broadcast receiver is switched to the new channel and controls the second output switch so that the video image is output when the intra frame notification signal is received; and
   the second output switch, which is turned on and off by the second switch controller.

7. A method of reducing channel switching delay in a digital broadcast receiver, the method comprising:
   receiving a channel switch command;
   receiving a broadcast signal of a channel to which the digital broadcast receiver is switched in response to the channel switch command and retrieving a transport stream;
   retrieving a video image from a video signal of the transport stream; and
   sensing reception of a first intra frame of the video signal input to the digital broadcast receiver after the digital broadcast receiver is switched to the new channel and controlling the video image to be directly output for display upon the sensing of the reception of the first intra frame.

8. The method of claim 7 further comprising controlling a background image stored in a memory to be output until sensing the first intra frame of the video signal input to the digital broadcast receiver after the digital broadcast receiver is switched to the new channel.

9. The method of claim 7, wherein the retrieving of the video image is carried out using an MPEG video codec.

10. The method of claim 7, wherein the receiving of the broadcast signal and the retrieving of the transport stream comprises:
    converting the received broadcast signal into an IF signal;
    controlling the IF signal to enter a locked state; and
    determining whether the IF signal is in the locked state and retrieving a transport stream from the IF signal if the IF signal is determined to be in the locked state.

11. A method of reducing channel switching delay in a digital broadcast receiver, the method comprising:
    outputting a retrieved broadcast signal to a display unit;
    receiving a channel switch command;
    outputting a signal received from a recording medium to the display unit based upon the channel switch command; and
    outputting the retrieved broadcast signal directly to the display unit upon detecting reception of an intra frame signal of the retrieved broadcast signal.

12. The method of claim 11, wherein the recording medium is a ROM (Read Only Memory).

13. The method of claim 11, wherein the recording medium is a HDD (Hard Disc Driver).

14. The method of claim 11, wherein the recording medium is a RAM (Random Access Memory).

15. The method of claim 11, wherein the signal is a background image.

16. The method of claim 11, wherein the signal is a previous outputted signal.

17. The method of claim 11, wherein the signal is an information signal.

18. A digital broadcast receiver, comprising:
    a signal reception unit, which receives a broadcast signal and converts the received broadcast signal into an intermediate frequency (IF) signal;
    a digital demodulation unit, which retrieves a transport stream from the IF signal;
    a demultiplexing unit, which extracts a video signal from the transport stream by parsing the transport stream;
    a video decoder, which retrieves a video image from the video signal by decoding the video signal; and
    an output selection unit, which prevents an image from a recording medium from being output and instead outputs the video image directly to a display control unit for display upon sensing reception of an intra frame of the video signal input to the video decoder after the digital broadcast receiver is switched to a new channel.

19. The digital broadcast receiver of claim 18, wherein the image is a still image or a moving image.

20. A digital broadcast reception method, comprising:
    displaying a predetermined image responsive to a channel switch signal;
    starting demodulation of a new channel responsive to a phase lock for the new channel; and
    outputting the new channel directly to a display upon detecting reception of a first intra frame of the new channel.

* * * * *